J. Reist,
Wash Boiler,
No. 45,272.      Patented Nov. 29, 1864.

Witnesses:
Theodore Bergen
Auvo J. Baswell

Inventor:
John Reist

UNITED STATES PATENT OFFICE.

JOHN REIST, OF PHILADELPHIA, PENNSYLVANIA.

IMPROVED WASH-KETTLE.

Specification forming part of Letters Patent No. 45,272, dated November 20, 1864.

*To all whom it may concern:*

Be it known that I, JOHN REIST, of the city of Philadelphia, and State of Pennsylvania, have invented a new and useful Improvement in Wash-Kettles; and I do hereby declare the following to be a full and exact description thereof, reference being had to the accompanying drawings, and to the figures and letters of reference marked thereon.

My invention relates to the kind of kettles used in households for boiling the clothes preparatory to washing them; and its object is partly to prevent the boiling over of the water, which, if not constantly watched and frequently stirred, results in carrying pieces of clothes over the edge of the kettle and burning them.

Another advantage derived from the use of my improvement consists in keeping all the clothes contained in the kettle equally hot and soaked, so that all portions are thoroughly boiled without the necessity of stirring, as needed with the ordinary kettles.

My invention will be readily understood from the accompanying drawing, forming part of this specification, in which similar letters of reference allude to similar parts throughout, and in which—

Figure 1:
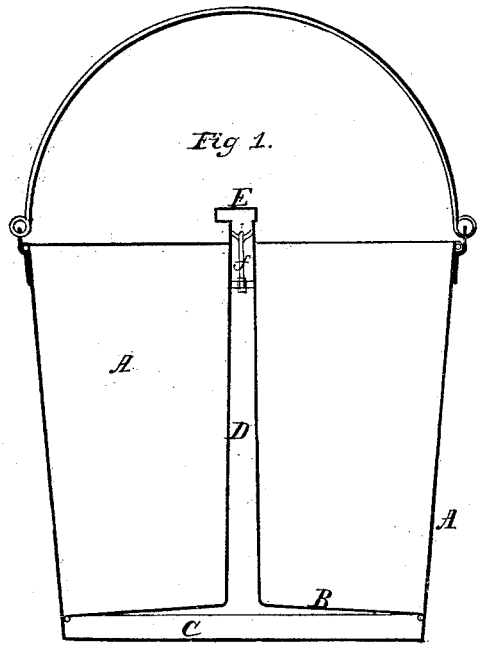
Figure 2:
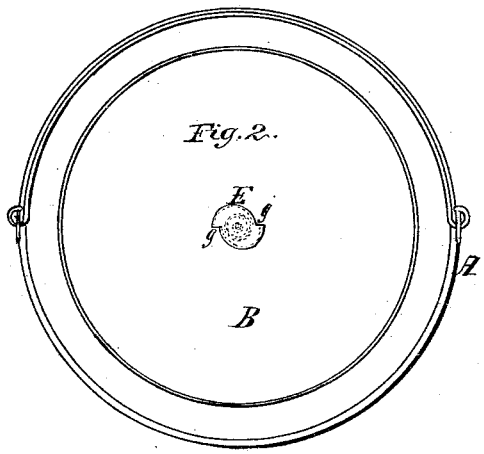

Figure 1 is a sectional elevation of my improved kettle, and Fig. 2 a plan of the same.

My invention consists in providing a wash-kettle, A, of the ordinary form, with a false bottom, B, suspended loosely about one-half inch above the bottom proper of the kettle in such a manner that the water can pass around the periphery of the false bottom into the shallow space C beneath it. The false bottom B, I provide in the center with an upright tube, D, extending in height slightly above the rim of the kettle, and communicating at the bottom with the space C. To the top of this tube D is attached a cap, E, arranged to rotate freely on its axis $f$, and provided with two or more outlets, $g\ g$. These outlets are so conformed to the axis of E that the rising steam and boiling water escaping through them will exert sufficient centrifugal force to cause the cap to rotate. The operation of the whole is then as follows: The boiling water in the space C, finding its readiest outlet through the tube D, ascends in the same, while a constant supply is furnished to the boiling-chamber by leakage around the false bottom B from the bulk of water above. The upward rising stream of water, in escaping through the outlet $g$, causes E to rotate on its axis, thus constantly distributing the boiling water over the whole area of the kettle, saturating all the clothes alike, and causing a constant drainage of the boiling hot water through the same from above.

It will be readily evident that the herein-claimed advantages are fully obtained by the above arrangement, the water being not only prevented from boiling over, and thus destroying the clothes, but instead distributed over the same from above, so that they may be boiled for any desired length of time without the heretofore required constant attention.

What I claim as my invention, and desire to secure by Letters Patent, is—

The described improvement in wash-kettles, consisting in the application thereto of a false bottom, B, upright tube D, and revolving cap-piece E, the whole operating substantially in the manner and for the purpose specially filed.

JOHN REIST.

Witnesses:
 THEODORE BERGNER,
 ANDREW E. BOSWELL.